United States Patent

[11] 3,567,155

| [72] | Inventors | James A. Gatlin<br>Bowie;<br>Henry C. Hoffman, Baltimore; Henry W.<br>Price, College Park; Benjamin G.<br>Zimmerman, Forest Heights, Md. |
|---|---|---|
| [21] | Appl. No. | 785,620 |
| [22] | Filed | Dec. 20, 1968 |
| [45] | Patented | Mar. 2, 1971 |
| [73] | Assignee | The United States of America as represented by the Administrator of the National Aeronautics and Space Administration |

[54] GRAVITY GRADIENT ATTITUDE CONTROL SYSTEM
11 Claims, 7 Drawing Figs.

[52] U.S. Cl. .................................................. 244/1
[51] Int. Cl. .................................................. B64g 1/00
[50] Field of Search .................................... 244/1 (SS); 74/5.5

[56] References Cited
UNITED STATES PATENTS
3,241,142 3/1966 Raabe ..................... 244/1(SS)X
3,302,905 2/1967 Davis et al. .............. 244/1(SS)
3,358,945 12/1967 Blount et al. ............ 244/1(SS)

*Primary Examiner* — George E. A. Halvosa
*Attorneys* — R. F. Kempf, E. Levy and G. T. Mc Coy ABSTRACT: A system for controlling and stabilizing the attitude of an artificial earth satellite includes a gravity gradient member mounted in a gimbal arrangement to have 2° of freedom. The angular deviation of the gravity gradient member and the satellite relative to the local vertical and the spacecraft angle command input signal selectively drive a plurality of inertial momentum wheels, one for each of the three spacecraft axes, provided to dampen the gravity gradient member librations. The gravity gradient member is controlled so that the equilibrium position of the longitudinal axis thereof is maintained in alignment with the local vertical in response to signals indicative of the rate of change of movement thereof with respect to the remainder of the satellite and a signal indicative of the angular deviation of the satellite position from the angle command.

PATENTED MAR 2 1971

INVENTORS.
JAMES A. GATLIN
HENRY W. PRICE
HENRY C. HOFFMAN
BENJAMIN G. ZIMMERMAN

BY
Carl Lew
ATTORNEYS

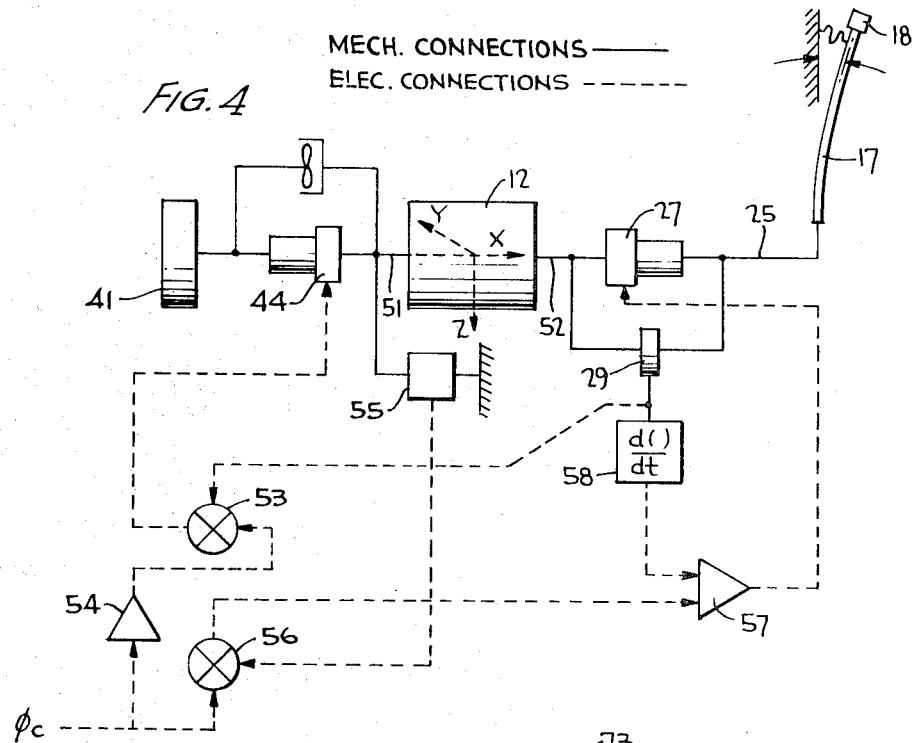
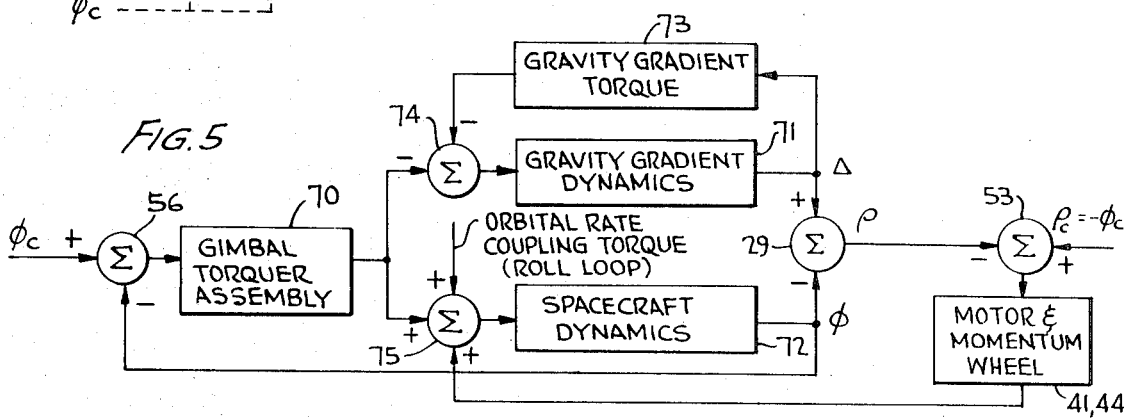
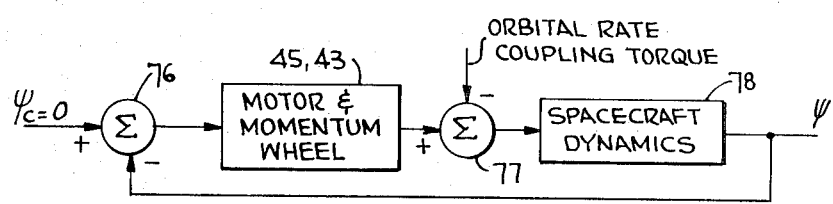
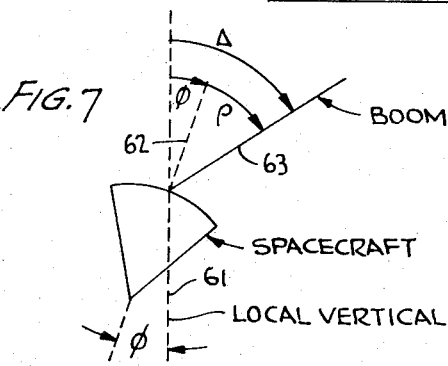
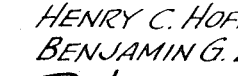

GRAVITY GRADIENT ATTITUDE CONTROL SYSTEM

The invention described herein was made by employees of the United States Government and may be manufactured and used by or for the Government or governmental purposes without the payment of any royalties thereon or therefor.

The present invention relates generally to systems for controlling and stabilizing the attitude of artificial earth satellites and, more particularly, to a satellite attitude stabilizer and controller wherein librations due to a gravity gradient member are damped by inertial means driven in response to the angular displacement of the gravity gradient member from a local vertical.

Systems for controlling and stabilizing the attitude of artificial earth satellites have generally taken one of two forms, viz: (1) completely passive systems utilizing only gravity gradient members secured to the satellite; and (2) completely active systems utilizing reaction jets in combination with inertial members, usually in the form of momentum wheels.

The completely passive and, hence, reliable attitude control systems utilizing gravity gradient members are frequently considered deficient because they provide only 2° to 5° of pointing accuracy at the higher orbital altitudes, required for synchronous satellite operation. Completely passive attitude control systems also suffer from poor transient response, in that a significant time period is required to stabilize the satellite after the occurrence of a disturbance from, for example, solar pressure. Because of the relative inaccuracy and poor transient response inherently attendant with completely passive attitude controllers, the use of space vehicles having such controllers is limited, in communications applications, to tracking radio sources with the satellite antenna having wide beam width and, therefore, relatively low gain. Another restriction on completely passive systems is the inability to change the spacecraft attitude relative to the gravity gradient member, whereby the pointing direction of an antenna on the satellite must be controlled independently of the spacecraft attitude.

To avoid the problem attendant with completely passive attitude controllers, there have been developed active attitude control and stabilization systems. The typical active attitude controller and stabilizer includes a relatively massive momentum wheel which functions in conjunction with a mass expulsion means, in the form of a reaction jet, or by activation of electromagnetic responsive means, in the form of electromagnets interacting with the magnetic field of the earth. The mass expulsion or electromagnetic means are required in combination with momentum wheels because of a phenomenon known as momentum saturation. Momentum saturation occurs because the torque of a momentum wheel saturates at some value of wheel speed, i.e., as the speed of the wheel increases to a certain level a motor shaft driving the wheel cannot be accelerated, whereby the torque which the momentum wheel can exert on the satellite drops to zero. By utilizing the mass expulsion and/or electromagnetic techniques, the momentum storage of the momentum wheel can be reduced so that the momentum wheel can control the spacecraft attitude as required.

Because of the fuel requirements for activating a reaction jet, satellites utilizing mass expulsion for attitude control have a life limited to on the order of 2 years. Electromagnetic techniques for preventing momentum wheel saturation are not attractive at synchronous altitudes because the magnetic field of the earth at such altitudes is weak and unpredictable. A further disadvantage attendant with the use of momentum wheels in combination with reaction jets or electromagnetic means is the considerable weight required by the momentum wheels. The momentum wheels must have sufficient inertia, hence weight, to be the primary satellite position controller.

In accordance with the present invention, the aforementioned problems attendant with both passive gravity gradient systems and systems utilizing momentum wheels in combination with momentum wheel desaturation devices are obviated by a spacecraft attitude controller and stabilizer that utilizes a gravity gradient member having its librations damped by a momentum wheel. Three momentum wheels are provided, each having its spin axis parallel with a different one of the spacecraft roll, pitch and yaw axes. The momentum wheels having spin axes in the direction of spacecraft flight and in the vertical direction (pointing toward the earth), i.e., the roll and yaw axes, are coupled with each other by a torque developed in response to the constantly changing orientation of the satellite in orbit, while the momentum wheel along the remaining pitch axis is relatively independent of the satellite orbital angle. Because the momentum wheels are utilized solely for damping librations of the gravity gradient member, the problem of momentum wheel saturation is completely obviated. In other words, torques developed by the gravity gradient member produce an effect similar to the torques in the prior art active system, while the momentum wheels stabilize librations of the gravity gradient member to an extent that is unattainable in a completely passive system.

An important feature of the present invention, that is unrealizable in prior art passive gravity gradient stabilization systems, is the ability to point the spacecraft at an angle removed from the local vertical. The satellite and gravity gradient pointing angle deviation is attained by gimbaling the gravity gradient member so that it is free to move about the roll and pitch axes relative to the spacecraft. Thereby, the spacecraft yaw axis can be displaced relative to the local vertical, and the equilibrium position of the gravity gradient member remains along the local vertical.

It is, accordingly, an object of the present invention to provide a new and improved attitude control and stabilization system for artificial earth satellites.

Another object of the invention is to provide an attitude controller for artificial space satellites utilizing a gravity gradient member wherein the satellite yaw axis can be controlled independently of the gravity gradient member.

Still another object of the invention is to provide an artificial earth satellite including a gravity gradient member attitude control and stabilization system which is more accurate and has a faster transient response than prior art controllers utilizing gravity gradient members.

An additional object of the invention is to provide an artificial earth satellite attitude control and stabilization system utilizing momentum wheels, wherein momentum wheel saturation is completely obviated.

Yet another object of the invention is to provide an attitude controller for artificial earth satellites utilizing momentum wheels, but not requiring jet reaction or electromagnetic means for preventing momentum saturation of the momentum wheels.

Yet a further object of the invention is to provide an artificial earth satellite attitude controller and stabilizer that combines the most desirable features of passive gravity gradient systems with those of mass expulsion systems, while eliminating the undesirable features of these two systems.

The above and still further objects, features and advantages of the present invention will become apparent upon consideration of the following detailed description of one specific embodiment thereof, especially when taken in conjunction with the accompanying drawings, wherein:

FIG. 4 is an electromechanical schematic diagram illustrating the apparatus included in one axis of the controller of the present invention;

FIG. 5 and 6 are functional block diagrams respectively indicating the roll and yaw loop responses of a spacecraft in accordance with the present invention; and FIG. 7 is a diagram illustrating the angular relationships between the spacecraft, gravity gradient member and local vertical.

Figure 1:
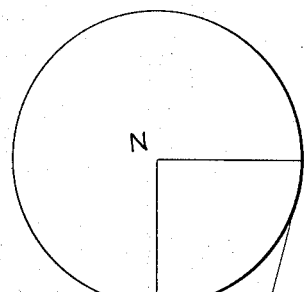
FIG. 1 is an illustration of a synchronous satellite at two positions and attitudes relative to a space, rather than global, reference.
Figure 1:
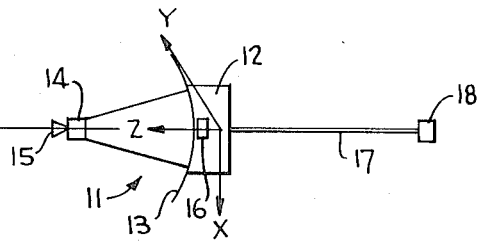

Reference is now made to FIG. 1 of the drawings wherein artificial earth satellite 11, which is not spin stabilized, is illustrated as being positioned at a synchronous altitude of 22,200 statute miles above the earth on an equatorial orbit for two positions displaced from each other by 90°. The two positions of satellite 11 illustrated in FIG. 1 are with regard to a reference external to the earth, as the satellite 11 moves with the same rotational velocity as the planet, so that it appears to be stationary relative to earth.

Satellite 11, in a typical configuration, includes an instrument capsule 12, to which is secured rigidly a radio antenna structure comprising reflecting dish 13 and feed 14. Mounted on feed 14 is infrared sensor 15, positioned so that it is capable of deriving signals to indicate the angular position of the horizon of the earth relative to satellite 11. Infrared sensor 15 is connected to electronic circuitry, known to those skilled in the art, for deriving signals indicative of the horizon angular position relative to first and second planes respectively including the roll and yaw axes and the pitch and yaw axes of satellite 11.

In the FIGS., the roll and pitch axes of spacecraft 11 are respectively designated by the coordinate axes $x$ and $y$, while the satellite yaw axis is designated by the $z$ coordinate axis. For purposes of reference, the roll or $x$ axis of spacecraft 11 is designated as the axis of the spacecraft direction of flight, the satellite yaw or $z$ axis is directed toward the earth through the axis of the satellite transverse to the roll axis and the pitch or $y$ axis is the axis at right angles to both the $x$ and $z$ axes.

To determine the orientation of spacecraft 11 relative to a third plane including the roll and pitch axes, about the $z$ or yaw axis, star tracking detector 16 is provided. Detector 16 includes a window which always points in a northerly direction toward the star Polaris and derives signals indicative of the spacecraft rotation about the yaw axis. Because space craft 11 is of the stationary type, rather than being spin stabilized, detector 16 always points in a northerly direction, normal to the plane of satellite movement in an equatorial orbit.

To control the pointing angle of body 12 and dish 13 relative to a point on earth, a gravity gradient member is rotatably mounted on capsule 12 with 2° of freedom for rotation about the $x$ and $y$ axes respectively in planes including the $z$ axis. The gravity gradient member comprises a 150 foot, 8 pound flexible boom 17, having one end gimbaled to capsule 12 so that it is free to move about the spacecraft roll and pitch axes in planes including the yaw axis. At the other end of boom 17 is fixedly mounted tip mass 18, which has a weight on the order of 15 pounds. The boom 17 and tip mass 18, together comprising the gravity gradient member, have an inertia of approximately 12,700 slug feet$^2$ and a first mode frequency of 0.062 radians per second, for the specified parameters. The maximum torque which can be exerted on capsule 12 by the gravity gradient member described is on the order of $10^{-4}$ foot pounds, for an angle between the gravity gradient member and vertical to the earth of 45°.

The gravity gradient member comprising boom 17 and tip mass 18 controls the attitude of capsule 12 by providing torques along the roll and pitch axes of the capsule. The longitudinal axis of the gravity gradient member, lying along the length of boom 17, is controlled, as seen infra, to have a stabilized position aligned with the local vertical gravity vector, i.e., a gravity vector extending radially from the center of the earth to the location of satellite 11. If spacecraft 11 is perturbated by an external force, such as solar pressure, or is commanded to point antenna 13 toward the horizon of the earth, so that the yaw axis of capsule 12 is not coincident with the local vertical, the gravity gradient member will be controlled so that when in equilibrium it is aligned with the local vertical in response to a feedback arrangement described infra. In FIG. 1, these conditions are graphically illustrated since the spacecraft illustrated on the right side of the earth has the axis of antenna 13, along the $z$ axis of capsule 12, coincident with the local vertical, while the spacecraft illustrated below the earth has the $z$ axis of capsule 12 pointed at the horizon of the earth. In both instances, the longitudinal axis of boom 17 is coincident with the local vertical. The orientation angle command for the $z$ axis of capsule 12 so that it does not coincide with the local vertical may be controlled in response to a signal supplied to the spacecraft by an r.f. link between the spacecraft and earth, for example.

The 2° displaced orientations of satellite 11 illustrated in FIG. 1 result in a complementary relation for the orbital rate coupling torques exerted on satellite 11. The complementary relationship exists because the $x$ axis for the spacecraft position illustrated to the right of the earth is transformed into the negative $z$ axis for the spacecraft position illustrated below the earth, and vice versa for a transformation of the $z$ axis into the $x$ axis. In contrast, the $y$ axis of satellite 11 remains stationary in space since it is directed transverse to the direction of flight. Because of the complementary interrelationship between the torques along the spacecraft $x$ and $z$ axes, it is necessary to provide a feedback controller for the yaw axis, as well as the roll and pitch axes, even though the gravity gradient member does not have freedom of movement relative to the yaw axis of capsule 12.

Figure 2:
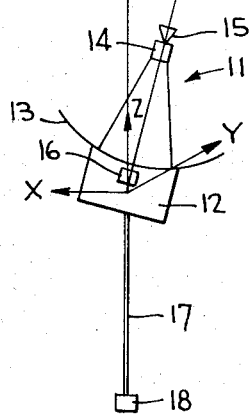
FIG. 2 is a perspective view illustrating the manner in which a boom is gimbaled in accordance with the present invention.
Figure 2:
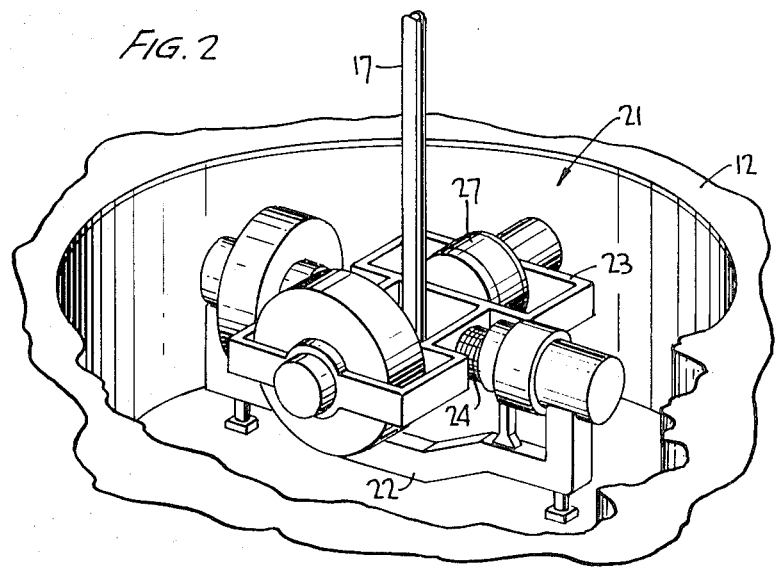
Figure 3:
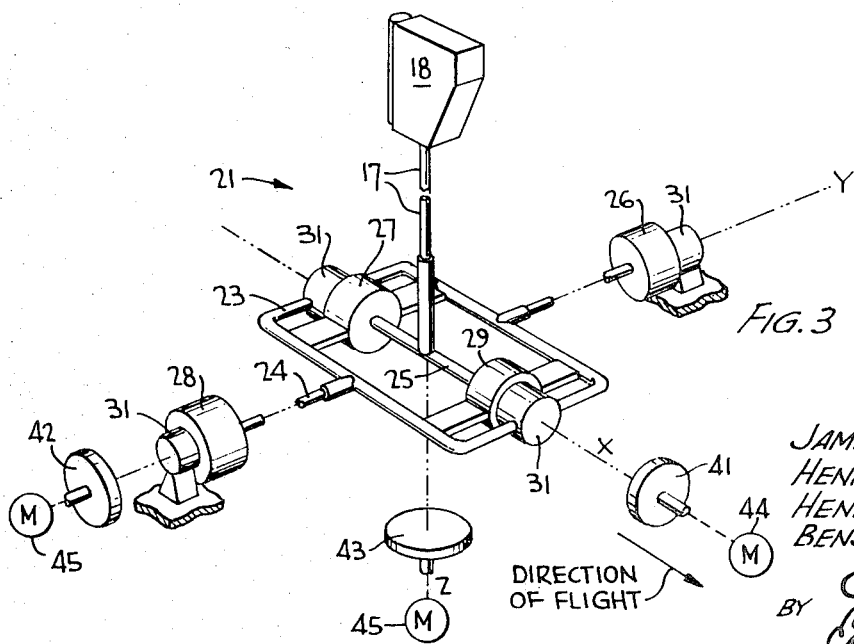
FIG. 3 is an exploded view showing the 2-axis gimbal for the boom, in combination with momentum wheel dampers for the boom librations.

Reference is now made to FIGS. 2 and 3 of the drawings wherein there are respectively illustrated perspective and exploded views of the mechanical means for controlling the position of boom 17 and for stabilizing the spacecraft attitude to compensate for torques applied to capsule 12 in response to librations of the gravity gradient member. To control the orientation of boom 17 with 2° of freedom relative to capsule 12, the capsule includes a 2-axis gimbal system 21. Gimbal system 21 includes outer gimbal 22, fixedly secured to the body of capsule 12, and inner gimbal 23, upon which boom 17 is rotatably mounted. Gimbals 22 and 23 respectively carry rotatable shafts 24 and 25, having longitudinal axes coincident with the pitch and roll axes of capsule 12. Shafts 24 and 25 are respectively driven for rotation relative to gimbals 22 and 23 by gimbal torques 26 and 27. Fixedly secured to a midpoint of shaft 25 is one end of boom 17 to establish the 2° of freedom for the gravity gradient member relative to capsule 12.

To monitor the rotational positions of shafts 24 and 25 and provide electric signal indications of the angular orientation of boom 17 relative to the yaw axis of capsule 12 in both the $x$–$z$ and $y$–$z$ planes, virtually frictionless optical encoders 28 and 29 are respectively mounted on the shafts. To support shafts 24 and 25 and lock them in position during satellite lift-off from the earth, bearing and gimbal lock housings 31 are positioned at opposite ends of each of the shafts. The bearing and gimbal lock housings 31 for shaft 25 are rigidly secured to gimbal 23, while the bearing and gimbal lock housings for shaft 24 are fixedly mounted on gimbal 22. To enable coupling of electrical signals between encoder 29 or gimbal torque 27 and electronic circuitry included in capsule 12, the torque and encoder are connected via suitable connections, such as spiral flex leads (not shown) to the electronic circuitry.

Torques resulting from librations of the gravity gradient member comprising boom 17 and tip mass 18 are damped by momentum wheels 41, 42 and 43. Momentum wheels 41, 42 and 43 are positioned so that the spin axes thereof are respectively coincident with the roll, pitch and yaw axes of capsule 12, whereby the momentum wheels apply restoring torques to the satellite in the three orthogonal directions of the $x$, $y$ and $z$ axes to dampen the gravity gradient librations. Each of momentum wheels 41, 42 and 43 is separately driven by motors 44, 45 and 46 so that changes in the rotational velocity of the momentum wheels produce torques to dampen the librations of the gravity gradient member.

Reference is now made to FIG. 4 of the drawings wherein there is illustrated an electromechanical schematic diagram for the roll axis controller of the present invention, i.i., the system for rotating boom 17 about the roll axis in the $y$–$z$ plane. For the roll axis controller, momentum wheel 41 is driven to dampen the boom librations that occur relative to the local vertical in the plane defined by the pitch (y) and yaw (z) axes of capsule 12. In response to reaction torques generated by gimbal torque 27 reacting against the inertia of the gravity gradient member in the y-z plane, capsule 12 is driven relative to the local vertical in the plane defined by the pitch and yaw axes thereof.

Considering now the specific roll axis controller of FIG. 4, the frames of gimbal torque 27 and motor 44 for respectively driving boom 17 and momentum wheel 41 are considered to be rigidly attached to the body of capsule 12 by the mechanical connections illustrated by lines 51 and 52. While the frame of gimbal torque 27 is not actually rigidly attached to the body of capsule 12, its position is invariable with respect to the plane including the capsule roll and yaw axes to enable the first assumption to be accurately made. The output shafts of gimbal torque 27 and motor 44 rotate about an axis coincident with the roll axis of capsule 12 to control the angle of boom 17 relative to the spacecraft yaw axis in the y-z plane and the rotational acceleration of momentum wheel 41, respectively. The angular position of boom 17 from the yaw axis of capsule 12 is monitored by angle sensing encoder 29, having one input fixed with respect to the roll axis of capsule 12 and a second input responsive to the rotation of shaft 25. The output of angle sensing encoder 29 is an angle $\rho$ equal to the difference between the deviation angle, $\Delta$, between the boom angle and the local vertical in the y-z plane, and the deviation angle, of capsule 12 from the local vertical in the y-z plane, i.e., $\rho = \Delta - $ To control selectively the angular orientation of the yaw axis of capsule 12 in the y-z plane, an r.f. link is established between a ground station (not shown) and a receiver on satellite 11. A signal is detected by the satellite received indicative of the desired angle, $_c$, of the yaw axis of capsule 12 relative to the local vertical in the y-z plane. The $_c$ signal is phase inverted by unity gain amplifier 54 to derive a signal indicative of the desired angular deviation, $\rho_c$, between the satellite yaw axis and the axis of boom 17 in the x-z plane. The $\rho_c$ and $\rho$ output signals respectively derived by amplifier 54 and encoder 29 are compared in electronic subtraction network 53, which derives an output having a magnitude indicative of the deviation of the actual and desired gravity gradient member angles in the y-z plane. The resulting $\rho_c - \rho$ output of subtractor 53 drives electric motor 44, which in turn drives momentum wheel 41 to dampen librations of the gravity gradient member in the y-z plane. Motor 44 is designed with sufficient internal viscous coupling to provide the damping required to stabilize the gravity gradient member, although the same result can be achieved, if necessary, with an external tachometer feedback network.

To control gimbal torque 27 the angular deviation, , of capsule 12 from the local vertical in the y-z plane is compared with the command signal $_c$. To this end, horizon sensor 55 responds to the output of cell 15 to derive a signal indicative of the actual angular position, , of capsule 12 in the y-z plane relative to the local vertical. The output of detector 55 is compared with $_c$ in subtractor 56 which derives a signal indicative of ( $_c - $ ) and is fed as one input to summing amplifier 57. The other input to amplifier 57 is indicative of the time rate of change ($\dot\rho$) of boom 17 relative to the yaw axis of capsule 12 in the y-z plane, derived by differentiating network 58, responsive to the $\rho$ indicating output of angle sensing encoder 29. The output of amplifier 57, an electrical signal indicative of the torque required to drive both capsule 12 and boom 17 toward their stable positions, is applied as an input to gimbal torque 27.

To describe the roll axis attitude controller more fully, reference is made to the functional block diagram of FIG. 5 and the angular relationships indicated by FIG. 7. In FIG. 7, the local vertical is illustrated as line 61, the yaw axis of capsule 12 in the y-z plane is indicated by line 62 and the deviation of the capsule yaw axis from the local vertical is indicated by the angle . An exemplary position of boom 17 is indicated by line 63 which is displaced from local vertical 61 by angle $\Delta$.

The angular displacement of boom 17 from the yaw axis of capsule 12 in the y-z plane is indicated by the angle $\rho$. At equilibrium, the angle $\Delta$ between lines 61 and 63 is zero and $\rho = -$ .

Considering now the functional block diagram of FIG. 5 in detail, the equal amplitude, but opposite polarity control signals $_c$ and $\rho_c$ are applied to difference nodes 56 and 53, respectively. The output of difference node 56 activates gimbal torque assembly 70 (including gimbal torque 27, differentiating network 58, and amplifier 57) to control the angular position of the gravity gradient member including boom 17 and tip mass 18 to change the relative angle between capsule 12 and the gravity gradient member in the y-z plane. These relationships are indicated by the connections between the output of gimbal torque assembly 70 and the inputs of the boxes 71 and 72 labeled gravity gradient member dynamics and spacecraft dynamics, respectively. The gravity gradient member responds to the output of gimbal torque assembly 70 so that boom 17 is rotated relative to the local vertical by an angle $\Delta$ to produce a gravity gradient torque on capsule 12 in the y-z plane. This gravity gradient torque is produced by the physical displacement of the boom 17 with the local of by the angle $\Delta$ as indicated by box 73 labeled gravity gradient torque. The gravity gradient torque is linearly combined with the output of gimbal torque assembly 70 at node 74 the output of which represents the net rotational torque applied to boom 17.

The torque produced by gimbal torque 27 affects the angular position, , of capsule 12 in the y-z plane with respect to the local vertical, as indicated by the output of box 72. The angular position of capsule 12 in the y-z plane is also influenced by the torques derived from accelerations of libration damping momentum wheel 41 and the rotation of spacecraft 11 due to the intercoupling of torques developed about the yaw and roll axes. These torques, as well as the torque produced by gimbal torque 27, are represented as being linearly combined in a cumulative manner at node 75 in FIG. 5, whereby they all have the same effect on the angular position of capsule 12.

The angle of the spacecraft relative to the local vertical is subtracted from the angle $\Delta$, indicative of the deviation of the gravity gradient member from the local vertical, in encoder 29, which functions effectively as a subtraction node, and feeds subtraction node 53. As indicated supra, subtraction node 53 compares the actual position of boom 17 in the y-z plane with the desired position thereof to activate motor 44 and control the acceleration of momentum wheel 41. The resulting loop through nodes 75, 56, 74, 29 and 53 which includes the spacecraft dynamic properties, as well as the torque developed by momentum wheel 41, can be considered as a boom control loop that forces $\rho$ to equal $\rho_c$ at the equilibrium position. Hence, the boom control loop drives the gravity gradient member so that boom 17 is substantially aligned with the local vertical.

To control the position of capsule 12 so that the angular orientation thereof may be removed from the local vertical by the angle $_c$, a capsule control loop subsists between the sensed position of capsule 12 in the y-xz plane, as measured by the angle , and the command input signal $_c$, through node 56 to gimbal torque 27. Because the capsule control loop has a much faster response than the boom control loop, it can be accurately considered that there is virtually no interaction between them and one acts independently of the other.

The functional block diagram for the pitch loop is substantially the same as the block diagram illustrated in FIG. 5 for the roll loop since the apparatus included in the two loops is identical with substitution of appropriate controllers and sensors. In a functional block diagram of the pitch loop, all angles are in the x-z plane, rather than the y-z plane. The sensors in the pitch loop cause the angle to be derived in response to the output of infrared detector 15 for an angle displaced from the local vertical by in the x-z plane. Similarly, the active elements in the pitch loop replace those of the roll loop whereby: momentum wheel 42 is substituted for momentum wheel 41; angular sensor encoder 28 is substituted for encoder 29; and gimbal torque 26 is substituted for gimbal torque 27.

There is, however, one significant difference between the roll and pitch loops, viz: in the pitch loop there is no orbital rate coupling torque input to node 75. The absence of an orbital rate coupling torque in the pitch loop occurs because the pitch axis is at right angles to the direction of spacecraft motion and thereby does not vary with the position of the spacecraft in space.

Reference is now made to FIG. 6 of the drawings wherein the dynamic rotational response to capsule 12 about the yaw or $z$ axis, in the $x$–$z$ plane, is considered. It is usually not desired to rotate capsule 12 about the yaw axis of the spacecraft, whereby the yaw axis command is present prior to launch so that it is equal to zero, i.e., $\Psi_c = 0$. The $\Psi_c$ signal is compared in subtraction node 76 with an indication of the actual yaw axis rotation of the spacecraft, $\Psi$, as monitored by Polaris star detector 16. The difference output of subtraction node 76 is applied as an input to motor 45 that controls the acceleration of yaw axis momentum wheel 43. The resulting torque derived by momentum wheel 43 on capsule 12 is physically subtracted from the yaw axis orbital rate coupling torque; it is to be recalled that the yaw axis orbital coupling torque is the complement of the roll orbital rate coupling torque is the complement of the roll orbital rate coupling torque of capsule 12.

The relationship between the torques developed by momentum wheel 43 and the yaw axis orbital rate coupling torque is indicated in FIG. 6 by subtraction node 77 in the box 78 labeled spacecraft dynamics. In response to the opposing yaw axis orbital rate coupling torque and the torque generated by accelerations of momentum wheel 43, spacecraft capsule 12 is rotated in the $x$–$z$ plane to maintain the angle $\Psi$ equal to zero.

While there has been described and illustrated one specific embodiment of the invention, it will be clear that variations in the details of the embodiment specifically illustrated and described may be made without departing from the true spirit and scope of the invention as defined in the appended claims. For example, the principles of the present invention are not necessarily applied only to synchronous satellites but are equally applicable to low orbiting satellites, although the greatest application of the invention is thought to be with regard to high altitude satellites. In addition, the gravity gradient member comprised of boom 17 and tip mass 18 can be replaced by any suitable mass pivotable about the main body of the spacecraft, as long as the moment of inertia of the pivotable mass in the longitudinal direction along the local vertical is on the order of 10 times or more greater than the transverse axis moment of inertia. Hence, boom 17 and tip mass 18 can be replaced with a nuclear fuel source which is desirably removed from either an instrument or a human payload that may be located in capsule 12. As a further modification, wheels 41—43 need not have their spin axes aligned with the roll, pitch and yaw axes of the momentum wheel gimbal configuration but the spin axes of the momentum wheels need merely be in a plane coincident with the roll, pitch and yaw axes. As a further modification, the main body of the spacecraft need not be symmetrical, that is, the spacecraft principle axes of inertia may be composed of different magnitudes of inertia and the pivotal axis of the gravity gradient member need not be coincident with the center of mass of the main body of the spacecraft. For a nonsymmetrical inertial body the gravity member may be commanded so that the longitudinal axis thereof is displaced from the local vertical so as to produce a torque to compensate for the gravity gradient torque resulting from the inertial properties of the main body of the spacecraft.

We claim:

1. An attitude control system for an artificial earth satellite capsule comprising a gravity gradient member mounted on the capsule with 2° of freedom, means for driving said member so that the member is driven towards a local vertical, inertia means for damping torques applied to the capsule in response to librations of the gravity gradient member from the local vertical and the angular deviation of the capsule from the local vertical for combining indications of said deviations, and means responsive to the angular displacement of the gravity gradient member from the local vertical for driving the inertia means.

2. The system of claim 1 wherein said inertia driving means is responsive to the attitude of the capsule.

3. The system of claim 1 wherein said inertia driving means derives a first signal indicative of the angular displacement of the gravity gradient member relative to the capsule, and means for comparing said first signal with a second signal indicative of the desired angular displacement of the gravity gradient member from the axis of the capsule.

4. The system of claim 1 wherein said member driving means is responsive to the angular deviation of the capsule from the local vertical.

5. The system of claim 1 wherein said member driving means is responsive to the angular deviation of the capsule from the local vertical and the time rate of change of angular movement of the gravity gradient member relative to the capsule.

6. The system of claim 1 wherein said member driving means is responsive to the time rate of change of angular movement of the gravity gradient member relative to the capsule.

7. The system of claim 1 wherein said member driving means includes means for deriving a first signal indicative of the angular deviation of the capsule from the local vertical, and means for comparing the first signal with a second signal indicative of the desired angular displacement of the capsule from the local vertical.

8. The system of claim 1 wherein said inertia driving means derives a first signal indicative of the angular displacement of the gravity gradient member relative to the capsule, and means for comparing said first signal with a second signal indicative of the desired angular displacement of the gravity gradient member from the axis of the capsule; and said member driving means includes means for comparing the first signal with another signal indicative of the desired angular displacement of the capsule from the local vertical.

9. A system for controlling the attitude of an artificial earth satellite capsule having roll, pitch and yaw axes, comprising a gravity gradient member mounted on the capsule so that it is free to pivot with respect to the roll and pitch axes, means for driving said member with respect to said roll and pitch axes so that the capsule is driven towards a commanded attitude and the member is driven towards a local vertical, three momentum wheels, a different one of said momentum wheels being mounted with the spin axis thereof parallel to a different one of the capsule axes, means responsive to both the angular deviation of the gravity gradient member from the local vertical and the capsule angular position relative to the local vertical in each of first and second planes respectively including the roll and yaw axes and the pitch and yaw axes for controlling the acceleration of the momentum wheels having spin axes 035671577 parallel to the roll and pitch axes, and means responsive to a signal indicative of the capsule yaw angle for controlling the acceleration of the momentum wheel having a spin axis parallel to the yaw axis.

10. The system of claim 9 wherein said member driving means includes means for sensing the deviations of the capsule from the local vertical in said first and second planes, the deviations in the first and second planes driving the gravity gradient member with respect to the roll and pitch axes, respectively.

11. The system of claim 10 further including means for deriving command signals indicative of a desired deviation angle of the capsule from the local vertical in said first and second planes, said means for driving the member with respect to the roll and pitch axes being responsive to said command signals, said means for controlling the momentum wheels having spin axes parallel to the roll and pitch axes being responsive to said command signals.

UNITED STATES PATENT OFFICE
CERTIFICATE OF CORRECTION

Patent No. 3,567,155           Dated March 2, 1971

Inventor(s) James A. Gatlin, et al

It is certified that error appears in the above-identified patent and that said Letters Patent are hereby corrected as shown below:

The line designation numbers, located between the colu[mns] in many instances do not identify the correct lines. Accor[ding]ly, the lines referred to below are the actual line numbers [and] the designated line numbers are not to be used for reference purposes.

Column 1, line 3, "or" (second occurrence) should appe[ar] as --for--.

Column 4, line 9, "2°" should appear as --two 90°--;

line 38, "torques" should appear as --torquer[--]

line 52, "torque" should appear as --torquer-- and line 70, "i.i." should appear as --i.e.--.

Column 5, lines 3,8,12,16,50 and 65, "torque" should ap[pear] as --torquer--;

line 26, before "of" there should appear --$\phi$-[-]

line 28, before "." there should appear --$\phi$--

UNITED STATES PATENT OFFICE
CERTIFICATE OF CORRECTION

Patent No. 3,567,155      Dated March 2, 1971

Inventor(s)   James A. Gatlin, et al    PAGE - 2

It is certified that error appears in the above-identified patent and that said Letters Patent are hereby corrected as shown below:

line 33, after "angle," there should appear --$\phi$--;

line 34, after "The" there should appear --$\phi$ line 42, "$P_c$ -poutput" should appear as --$P_c$ output--;

line 50, after "deviation," there should app --$\phi$--;

line 52, after "signal" there should appear line 54, after "position," there should appe --$\bar{\phi}$--;

line 55, after "The" there should appear --$\ddot{\phi}$ line 56, after "with" there should appear -- line 57, ( $_c$ - ) should appear as ($\bar{\phi}_c$ - $\phi$)- line 72, after "angle" there should appear -

Column 6, line 4, after "=-" there should appear --$\phi$-- line 7, after "signals" there should appear

UNITED STATES PATENT OFFICE
CERTIFICATE OF CORRECTION

Patent No. 3,567,155     Dated March 2, 1971

Inventor(s) James A. Gatlin, et al     PAGE - 3

It is certified that error appears in the above-identified paten and that said Letters Patent are hereby corrected as shown below:

line 9, "torque" (both occurrence) should ap as --torquer--;

lines 15,18,25 and 60, "torque" should appea --torquer--;

lines 28 and 36, "torque" (second occurrence should appear as --torquer-- line 29, after "position," there should appe $--\phi--$;

line 39, after "position" there should appea $--\phi--$;

lines 40,57,59 and 70, after "angle" there sl appear $--\phi--$;

line 59, after "signal" there should appear and line 72, after "by" there should appear $--\phi--$

UNITED STATES PATENT OFFICE
CERTIFICATE OF CORRECTION

Patent No. 3,567,155     Dated March 2, 1971

Inventor(s) James A. Gatlin, et al     PAGE - 4

It is certified that error appears in the above-identified patent and that said Letters Patent are hereby corrected as shown below:

Column 7, line 3, "torque" (both occurrences) should ap as --torquer--;

line 26, should be omitted in its entirety; a lines 56 and 57, "momentum wheel" should be omitted.

Claim 1, line 6 (line 1 of Column 8), after "member" th should appear --said inertia means incl means responsive to the angular deviati of the gravity gradient member--.

Claim 9, line 16, (line 57 of Column 8), "035671577" sh be omitted.

Signed and sealed this 14th day of March 1972.

(SEAL)
Attest:

EDWARD M. FLETCHER, JR.      ROBERT GOTTSCHALK